United States Patent
Wang et al.

(10) Patent No.: US 10,925,063 B2
(45) Date of Patent: Feb. 16, 2021

(54) USER SELECTION METHOD FOR NON-ORTHOGONAL MULTIPLE ACCESS SYSTEM AND BASE STATION THEREOF

(71) Applicant: National Tsing Hua University, Hsinchu (TW)

(72) Inventors: Chin-Liang Wang, Hsinchu (TW); Po-En Wu, Tainan (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 16/594,096

(22) Filed: Oct. 7, 2019

(65) Prior Publication Data
US 2020/0112962 A1  Apr. 9, 2020

(30) Foreign Application Priority Data
Oct. 9, 2018  (TW) .............................. 107135649 A

(51) Int. Cl.
*H04B 7/0408* (2017.01)
*H04W 72/04* (2009.01)
(Continued)

(52) U.S. Cl.
CPC ......... *H04W 72/0473* (2013.01); *H04L 5/006* (2013.01); *H04W 52/241* (2013.01);
(Continued)

(58) Field of Classification Search
CPC ... H04W 52/346; H04L 27/2613; H04L 5/006
See application file for complete search history.

(56) References Cited

U.S. PATENT DOCUMENTS

| 9,974,081 B2 | 5/2018 | Wang et al. | |
|---|---|---|---|
| 2014/0314006 A1* | 10/2014 | Suh .................... | H04B 7/0626 370/329 |

(Continued)

FOREIGN PATENT DOCUMENTS

| CN | 106385300 | 2/2017 |
|---|---|---|
| CN | 107154814 | 9/2017 |

(Continued)

OTHER PUBLICATIONS

Han Zhang et al., "User Pairing Algorithm with SIC in Non-Orthogonal Multiple Access System", IEEE ICC 2016—Wireless Communications Symposium, May 2016, pp. 1-6.

(Continued)

Primary Examiner — Tu X Nguyen
(74) Attorney, Agent, or Firm — JCIPRNET

(57) ABSTRACT

The disclosure provides a user selection method for non-orthogonal multiple access (NOMA) systems and a base station thereof. The method includes: (1) initializing the cluster-partition parameter i to be 2; (2) dividing N user devices into i clusters; (3) selecting a reference device from each of the i clusters to form a reference cluster; (4) performing a power allocation algorithm for the reference cluster to calculate a power allocation factor for each of the reference devices; (5) determining whether each of the reference devices with the calculated power allocation factors meets a set of constraints: if all of the reference devices meet the set of constraints, increasing the value of i by 1 and then going back to step (2); if any one of the reference devices does not meet the set of constraints and i is not equal to 2, performing NOMA transmission for the reference cluster.

13 Claims, 5 Drawing Sheets

(51) Int. Cl.
    *H04W 52/26*    (2009.01)
    *H04L 5/00*     (2006.01)
    *H04W 52/24*    (2009.01)
    *H04W 88/08*    (2009.01)
    *H04W 52/34*    (2009.01)

(52) U.S. Cl.
    CPC ....... *H04W 52/267* (2013.01); *H04W 52/346* (2013.01); *H04W 88/08* (2013.01)

(56)          References Cited

U.S. PATENT DOCUMENTS

2015/0003370 A1    1/2015    Yokomakura et al.
    2015/0312074 A1   10/2015    Zhu et al.
    2017/0257868 A1    9/2017    Wang et al.

FOREIGN PATENT DOCUMENTS

TW        I608745       12/2017
    TW        I628969        7/2018
    TW        201836395     10/2018

OTHER PUBLICATIONS

Wenbo Cai et al., "User Selection and Power Allocation Schemes for Downlink NOMA Systems with Imperfect CSI", 2016 IEEE 84th Vehicular Technology Conference (VTC-Fall), Sep. 2016, pp. 1-5.

MD Shipon Ali et al., "Dynamic User Clustering and Power Allocation for Uplink and Downlink Non-Orthogonal Multiple Access (NOMA) Systems", IEEE Access, vol. 4, Aug. 2016, pp. 6325-6343.

Abdelsalam Sayed-Ahmed et al., "User Selection and Power Allocation for Guaranteed SIC Detection in Downlink Beamforming Non-Orthogonal Multiple Access", IEEE 2017 Wireless Days, Mar. 2017, pp. 188-193.

Soumendra Nath Datta et al., "Optimal power allocation and user selection in non-orthogonal multiple access systems", IEEE Wireless Communications and Networking Conference (WCNC 2016)—Track 2—MAC and Cross Layer Design, Apr. 2016, pp. 1-6.

Office Action of Taiwan Counterpart Application, dated Sep. 17, 2019, pp. 1-15.

"Office Action of Taiwan Counterpart Application," dated Sep. 17, 2019, p. 1-p. 15.

* cited by examiner

USER SELECTION METHOD FOR NON-ORTHOGONAL MULTIPLE ACCESS SYSTEM AND BASE STATION THEREOF

CROSS-REFERENCE TO RELATED APPLICATION

This application claims the priority benefit of Taiwan application serial no. 107135649, filed on Oct. 9, 2018. The entirety of the above-mentioned patent application is hereby incorporated by reference herein and made a part of this specification.

BACKGROUND

Field of the Invention

The disclosure relates to a base station in a communication system and a user selection method thereof. More particularly, the disclosure relates to a base station in a non-orthogonal multiple access (NOMA) system and a user selection method thereof.

Description of Related Art

In the fourth generation (4G) wireless communication systems, orthogonal multiple access (OMA) techniques have been used in order to achieve preferable sum throughputs. However, with the continuing growth in data traffic and the emergence of new application scenarios, demands for system capacity in wireless communications are getting higher. To cater for this trend, non-orthogonal multiple access (NOMA) techniques have received considerable attention in the development of future wireless communication systems, including the fifth generation (5G) and beyond.

Power-domain NOMA (referred to NOMA throughout this document) is a technique that allocates appropriate power to each user for superposing messages of multiple users at a transmitter, such that the multiple users can share the same frequency band at the same time for transmission of their messages. The superposed messages for the multiple users can be separated by using a successive interference cancellation (SIC) technique at the receiver sides (i.e., users' terminals). On the whole, NOMA can improve the utilization efficiency of channel resources and offer better system capacity performance than OMA.

Nevertheless, there are many issues existing in NOMA systems need to be overcome. For example, in a NOMA system scenario that a base station is capable of serving multiple user devices simultaneously, how to select user devices for the service each time to maximize the system capacity while guaranteeing detection performance is an important subject.

SUMMARY

Accordingly, the disclosure provides a base station in a non-orthogonal multiple access (NOMA) system and a user selection method thereof which can allow the base station to select a part of user devices from multiple user devices based on a specific mechanism, so as to achieve system capacity maximization while guaranteeing signal detection performance for each user device.

A user selection method for a NOMA system serving N user devices is provided by the disclosure. The method includes: (a) dividing the N user devices into i clusters, wherein i and N are positive integers, and i ranges between 2 and N; (b) selecting a reference device from each of the i clusters to form a reference cluster; (c) performing a power allocation algorithm for the reference cluster to determine a reference power allocation factor for each of the reference devices, and accordingly checking whether each of the reference devices meets at least one constraint; and (d) if not every reference device in the reference cluster meets the at least one constraint, performing NOMA transmission for a candidate cluster, wherein the candidate cluster is formed by a candidate device in each of i−1 clusters when the N user devices are divided into the i−1 clusters, and the candidate device in each of the i−1 clusters meets the at least one constraint.

A base station, adapted for serving N user devices in a NOMA system is provided by the disclosure. The base station includes a transceiver circuit, a storage circuit and a processing circuit. The transceiver circuit is configured to transmit messages to at least two user devices. The storage circuit stores a plurality of modules. The processing circuit is coupled to the storage circuit and the transceiver circuit, and is configured to access the modules to perform steps including (a) dividing the N user devices into i clusters, wherein i and N are positive integers, and i ranges between 2 and N; (b) selecting a reference device from each of the i clusters to form a reference cluster; (c) performing a power allocation algorithm for the reference cluster to determine a reference power allocation factor for each of the reference devices, and accordingly checking whether each of the reference devices meets at least one constraint; and (d) if not every reference device in the reference cluster meets the at least one constraint, performing NOMA transmission for a candidate cluster, wherein the candidate cluster is formed by a candidate device in each of i−1 clusters when the N user devices are divided into the i−1 clusters, and the candidate device in each of the i−1 clusters meets the at least one constraint.

A user selection method in a NOMA system serving N user devices is provided by the disclosure. The method includes: (a) dividing the N user devices into i clusters, wherein i and N are positive integers, and i is in the range between 2 and N; (b) selecting a reference device from each of the i clusters to form a reference cluster; (c) performing a power allocation algorithm for the reference cluster to calculate a reference power allocation factor for each of the reference devices, and accordingly checking whether each of the reference devices meets a set of constraints; and (d) if any one of the reference devices in the reference cluster does not meet the set of constraints, performing NOMA transmission for a candidate cluster, wherein the candidate cluster is formed by a candidate device in each of i−1 clusters when the N user devices is divided into the i−1 clusters, and the candidate device in each of the i−1 clusters meets the set of constraints.

To sum up, in the user selection method of the disclosure, after the user devices are divided into i clusters, a user device can be selected from each of the i clusters to serves as a reference device to form the reference cluster. Then, the power allocation algorithm can be performed for the i reference devices in the reference cluster, and whether all the i user devices meet the constraints can be checked. If no, the NOMA transmission can be performed for the candidate cluster (i.e., the reference cluster formed in the previous case of i−1 clusters), thereby maximizing the number of the candidate devices served by the base station each time while guaranteeing the detection performance and SIC performance for each candidate device.

In order to make the aforementioned and other features or advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
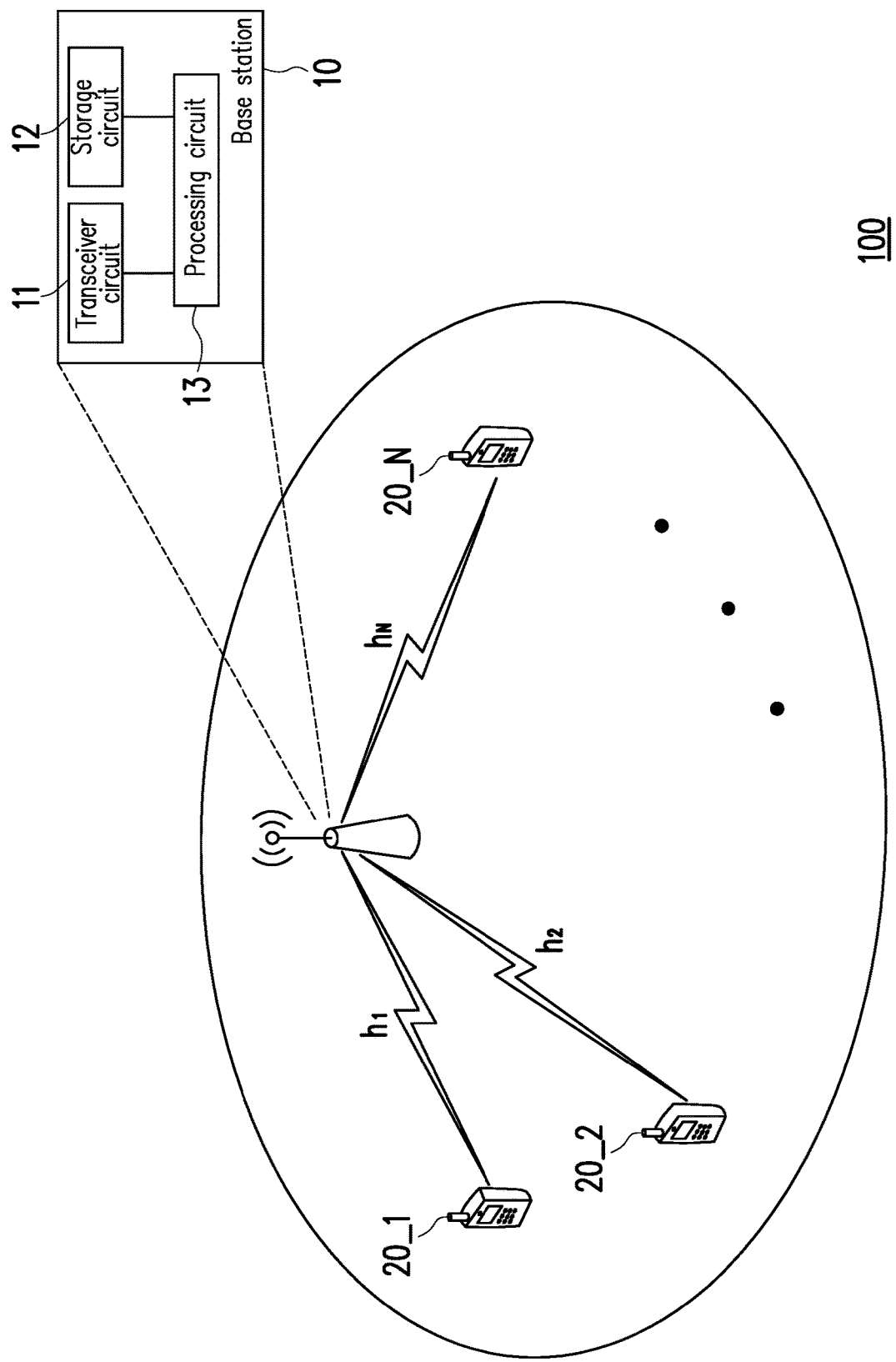
FIG. 1 is a schematic diagram illustrating a non-orthogonal multiple access (NOMA) system according to an embodiment of the disclosure.

Referring to FIG. 1, it is a schematic diagram illustrating a non-orthogonal multiple access (NOMA) system according to an embodiment of the disclosure. In the present embodiment, a NOMA system 100 includes a base station 10 and user devices 20_1, 20_2, . . . , 20_N (N is a positive integer), wherein the user devices 20_1-20_N may form a cluster served by the base station 10.

Each of the user devices 20_1-20_N, for example, may be implemented as (but not limited to) a mobile station, an advanced mobile station (AMS), a server, a user terminal, a desktop computer, a laptop computer, a network computer, a workstation, a personal digital assistant (PDA), a tablet personal computer (tablet PC), a scanner, a telephone device, a pager, a camera, a television, a palm video game device, an audio device, a wireless sensor, and so on, which is not limited in the disclosure.

The base station 10 may include (but not limited to), for example, an eNB, a home eNB, an advanced base station (ABS), a base transceiver circuit system (BTS), an access point, a home BS, a relay, an intermediate node, an intermediate equipment and/or a satellite-based communication base station, but the implementable manners of the disclosure are not limited thereto.

In the embodiment of the disclosure, the base station 10 may be at least represented by function elements depicted in FIG. 1. The base station 10 may at least include (but not limited to) a transceiver circuit 11, a storage circuit 12 and a processing circuit 13. The transceiver circuit 11 may include a transmitter circuit, an analog-to-digital (A/D) converter, a D/A converter, a low noise amplifier, a mixer, a filter, an impedance matcher, a transmission line, a power amplifier, one or more antenna circuits and a local storage medium element (but the disclosure is not limited thereto), such that the base station 10 may provide wireless transmitting/receiving functions for the user devices 20_1-20_N. The storage circuit 12 is, for example, a memory, a hard disk, or other elements capable of storing data, and may be configured to record a plurality of program codes or modules.

The processing circuit 13 is coupled to the transceiver circuit 11 and the storage circuit 12, and may be a processor for general purposes, a processing circuit for special purposes, a conventional processing circuit, a digital signal processing circuit, a plurality of microprocessors, one or more microprocessors, controllers and microcontrollers which are combined with a core of the digital signal processing circuit, an application specific integrated circuit (ASIC), a field programmable gate array (FPGA), any other integrated circuits, a state machine, a processing circuit based on advanced RISC machine (ARM), and the like.

In the present embodiment, the processing circuit 13 may access and execute the modules in the storage circuit 12, so as to perform a power allocation algorithm provided by the disclosure, and details thereof will be described below.

In FIG. 1, it is assumed that global channel state information (global CSI) is known. In the NOMA system 100, the base station 10 may allocate power $P_1, P_2, \ldots, P_N$ to signals $S_1, S_2, \ldots, S_N$ to be sent to the user devices 20_1, 20_2, . . . , 20_N, superimpose the signals and broadcast the superimposed signals to the user devices 20_1-20_N. In the present embodiment, the superimposed signals may be denoted by $x = \sum_{n=1}^{N} \sqrt{P_n} S_n$, wherein the signal $S_n$ is normalized to $E[|s_n|^2]=1$ (where $E[\cdot]$ is a statistical expectation value).

In the condition that the global CSI is known, it represents that channel fading coefficients (hereinafter referred to as $h_n$) between the user device 20_n (where n is a positive integer greater than or equal to 1 and less than or equal to N) and the base station 10 are all known. Correspondingly, the channel gain between the user device 20_n and the base station 10 may be denoted by $|h_n|^2$.

For descriptive convenience, it is assumed that $|h_1|^2 > |h_2|^2 > \ldots > |h_N|^2$, namely, the channel gain of each of the user devices 20_1-20_N is arranged in descending order. Additionally, for the user device 20_n, a signal (hereinafter referred to as $y_n$) received thereby may be expressed as $y_n = h_n x + v_n$, wherein $v_n$ represents an additive white Gaussian noise (AWGN) with zero mean and standard variance $\sigma_n^2$, and thus may be expressed as $CN(0, \sigma_n^2)$.

According to the NOMA principle, a user device with a larger channel gain (referred to as a stronger user device) should be correspondingly allocated with less transmission power, and namely, $P_1 < P_2 < \ldots < P_N$. In this case, for a user device with a lower channel gain (referred to as a weaker user device), the interference generated by a signal of the strong user device may be treated as noise for the weak user device to directly decode its own signal. On the other hand, the strong user device may directly decode its own signal after removing the signal decoded by the weak user device through an SIC process. Under the assumption of successful decoding and no error propagation for each user device, a channel capacity of the user device 20_n may be expressed as:

$$C_n = \log_2\left(1 + \frac{P_n |h_n|^2}{\sum_{k=1}^{n-1} P_k |h_n|^2 + V_0}\right), \quad (1)$$

wherein $V_0$ is a noise power of the AWGN.

In the present embodiment, in the consideration of quality of service (QoS) of the user device 20_n, a minimum transmission rate requirement (represented by $R_n$) is further defined in the disclosure. In this case, an optimization problem for the system capacity maximization with a total transmission power $P_T$ can be formulated by constraints as follows:

$$\max_{\{P_1, P_2, \ldots, P_N\}} \sum_{n=1}^{N} C_n \qquad (2a)$$

$$\text{subject to } \sum_{n=1}^{N} P_n = P_T \qquad (2b)$$

$$P_n > 0, \forall n \qquad (2c)$$

$$P_N > P_{N-1} > \ldots > P_1 \qquad (2d)$$

$$C_n \geq R_n, \forall n \qquad (2e)$$

In the optimization problem mentioned above, constraint (2d) represents that according to the NOMA principle, the transmission power allocated to a weak user device must be larger than that allocated to a strong user device, while constraint (2e) shows that the channel capacity of each user device must satisfy the corresponding minimum transmission rate requirement to guarantee QoS.

For the user device $20\_n$, power allocation factors (denoted by $\alpha_n$) may be defined, and the allocated transmission power thereof may be expressed as $P_n = \alpha_n P_T$. Namely, $P_1 = \alpha_1 P_T$, $P_2 = \alpha_2 P_T$, ..., $P_N = \alpha_N P_T$. In this case, the optimization problem can be expressed by constraints as follows:

$$\max_{\{\alpha_n\}} \sum_{n=1}^{N} C_n \qquad (3a)$$

$$\text{subject to } \sum_{n=1}^{N} \alpha_n = 1 \qquad (3b)$$

$$\alpha_N > \alpha_{N-1} > \ldots > \alpha_1 > 0 \qquad (3c)$$

$$\alpha_n - \sum_{k=1}^{n-1} \alpha_k (2^{R_n} - 1) \geq \frac{V_0}{P_T |h_n|^2}(2^{R_n} - 1), \forall n. \qquad (3d)$$

As a sum system capacity of the NOMA system 100 highly depends on a user device with the highest channel gain (which is the user device 20_1), in order to increase the sum system capacity of the NOMA system 100, the user device 20_1 has to be allocated with as much transmission power as possible. In addition, based on NOMA characteristics, constraint (3c) must also be maintained at the same time, which means that $R_n$ for each user device 20_n needs to be selected carefully to satisfy constraint (3d).

Accordingly, the disclosure provides a power allocation algorithm for allocating all the remaining transmission power to the user device 20_1 after properly determining $R_2$-$R_N$ for the user devices 20_1-20_N through a specific mechanism, thereby boosting the sum system capacity.

To determine a lower bound for $R_n$, a range thereof may be found by constraint (3d). First, when n=1, constraint (3d) may be expressed as:

$$\alpha_1 \geq \frac{1}{\mu_1} \phi_1, \qquad (4)$$

where $\phi_n = 2^{R_n} - 1$ and $\mu_n = (P_T |h_n|^2)/V_0$. Based on constraint (3c), $\phi_1$ and $\mu_1$ capable of achieving $\alpha_1 > 0$ must be selected. $\mu_n$ is larger than 0 no matter what value of n is, and thus the reciprocal of $\mu_1$ is inevitably positive and nonzero. In this case, it is only to ensure that $\phi_1$ is larger than 0 (i.e., $R_1$ must be larger than 0).

Next, when n=2, constraint (3d) may be expressed as:

$$\alpha_2 \geq \frac{\phi_2}{\mu_2} + \alpha_1 \phi_2 = \phi_2 \left( \frac{1}{\mu_2} + \alpha_1 \right). \qquad (5)$$

To meet $\alpha_2 > \alpha_1$ in constraint (3c), it may make $1/\mu_2 > 0$ in formula (5) and need to check whether $\phi_2 > 1$. In this case, it may be obtained that $R_2$ must be larger than 1, so that formula (5) is tenable. After the lower bound for $R_2$ is obtained, the relationship between $\alpha_1$ and $\alpha_2$ is maintained and simultaneously meets the NOMA principle.

Then, when n=3, constraint (3d) may be expressed as:

$$\alpha_3 \geq \frac{\phi_3}{\mu_3} + (\alpha_2 + \alpha_1)\phi_3 = \phi_3 \left( \frac{1}{\mu_3} + \alpha_2 + \alpha_1 \right). \qquad (6)$$

Based on formula (5), by setting $\alpha_1 = \alpha_2/\phi_2 - 1/\mu_2$ and substituting it into formula (6), the relationship between $\alpha_2$ and $\alpha_3$ may be correspondingly obtained, which is expressed as follows:

$$\alpha_3 \geq \phi_3 \left( \frac{1}{\mu_3} - \frac{1}{\mu_2} + \alpha_2 \left( 1 + \frac{1}{\phi_2} \right) \right). \qquad (7)$$

Based on the requirement for $|h_2|^2 > |h_3|^2$, a result of $-1/\mu_3 - 1/\mu_2$ is larger than 0. In addition, as the lower bound (i.e., 1) for $R_2$ is derived and obtained, it is induced that $\phi_2$ is inevitably larger than 1, while $(1+1/\phi_2)$ is inevitably larger than 0. Accordingly, as long as $\phi_3 > 1$, $\alpha_3$ may be set to be larger than $\alpha_2$. Thus, it may be known that $R_3 > 1$, and $\phi_3$ is also larger than 1. As what have been described in previous paragraphs, as if lower bound for $R_3$ is known, $\alpha_3 > \alpha_2$ is inevitably tenable and satisfies constraint (3c).

In light of the foregoing, lower bounds for $R_4$ to $R_n$ may be correspondingly derived as 1, which means that in the pursuit of system capacity maximization, it is impracticable to achieve a faster transmission rate merely for the strong user device while suppressing other user devices. In each of the user devices 20_1-20_N, even the user device with the lowest channel gain still requires to be allocated with a transmission power to maintain itself for operation such as an SIC operation.

For the user device 20_n, as long as $R_n$ may be appropriately set to be larger than its own lower bound, by substituting the value of $R_n$ into constraint (3d), a closed form of the power allocation factors corresponding to the user devices 20_1-20_N may be derived. $\alpha_n$ for any value of n greater than or equal to 1 and less than or equal to N may be expressed as:

$$\alpha_N = \frac{1 + \mu_N^{-1}}{1 + \phi_N^{-1}} \qquad (8a)$$

$$\alpha_n = \left( \frac{\alpha_{n+1}}{\phi_{n+1}} - \frac{1}{\mu_{n+1}} + \frac{1}{\mu_n} \right)\left( \frac{\phi_n}{1 + \phi_n} \right), n \in \{2, 3, \ldots, N-1\} \qquad (8b)$$

$$\alpha_1 = 1 - \sum_{n=2}^{N} \alpha_n. \qquad (8c)$$

As mentioned in the previous embodiment, in order to obtain $\alpha_n$ for each value of n, $\alpha_N$ (corresponding to the user device 20_N with the lowest channel gain in the cluster) may be first derived, and in the same way, $\alpha_{N-1}$, $\alpha_2$ may be derived. Afterwards, $\alpha_1$ may be obtained according to formula (8c).

For instance, when the value of N is 2 (i.e., there are only two user devices, 20_1 and 20_2, in the NOMA system 100), the power allocation factors corresponding to the weak user device and the strong user device may be respectively expressed as:

$$\alpha_2 = \frac{1+\mu_2^{-1}}{1+\phi_2^{-1}} \quad (9)$$

$$\alpha_1 = \left(\frac{1}{1+\phi_2}\right)\left(1-\frac{\phi_2}{\mu_2}\right). \quad (10)$$

In light of the foregoing, the power allocation algorithm of the embodiment of the disclosure may allow the base station 10, when serving the cluster formed by the N user devices 20_1-20_N, to obtain the power allocation factors $\alpha_1$-$\alpha_N$ corresponding to the user devices 20_1-20_N based on formulas (8a)-(8c). Thereafter, the transmission power $P_1, P_2, \ldots, P_N$ allocated for each of the user devices 20_1-20_N may be correspondingly obtained, and by substituting the transmission power $P_1, P_2, \ldots, P_N$ into $x = \Sigma_{n=1}^{N} \sqrt{P_n} s_n$, x is broadcasted to each of the user devices 20_1-20_N in the cluster, such that the user device 20_n may decode its own signal from $y_n$ as received based on the NOMA principle. In this way, the power allocation algorithm of the disclosure may guarantee QoS for each of the user devices 20_1-20_N to achieve system capacity maximization for the NOMA system 100.

However, if the base station 10 is required to simultaneously serve the user devices 20_1-20_N in each service, as the value of N increases, the total transmission power $P_T$ for the NOMA system 100 may be correspondingly divided into too many parts. In such circumstance, the detection performance of each of the user devices 20_1-20_N allocated with too little transmission power is reduced.

Accordingly, the embodiment of the disclosure further provides a user selection method for the NOMA system 100, which may allow the base station 10, in the presence of the user devices 20_1-20_N, to determine to serve only a part of the user devices 20_1-20_N based on a certain mechanism, thereby guaranteeing the detection performance for the user devices being served. The method is described in detail below.

Figure 2:
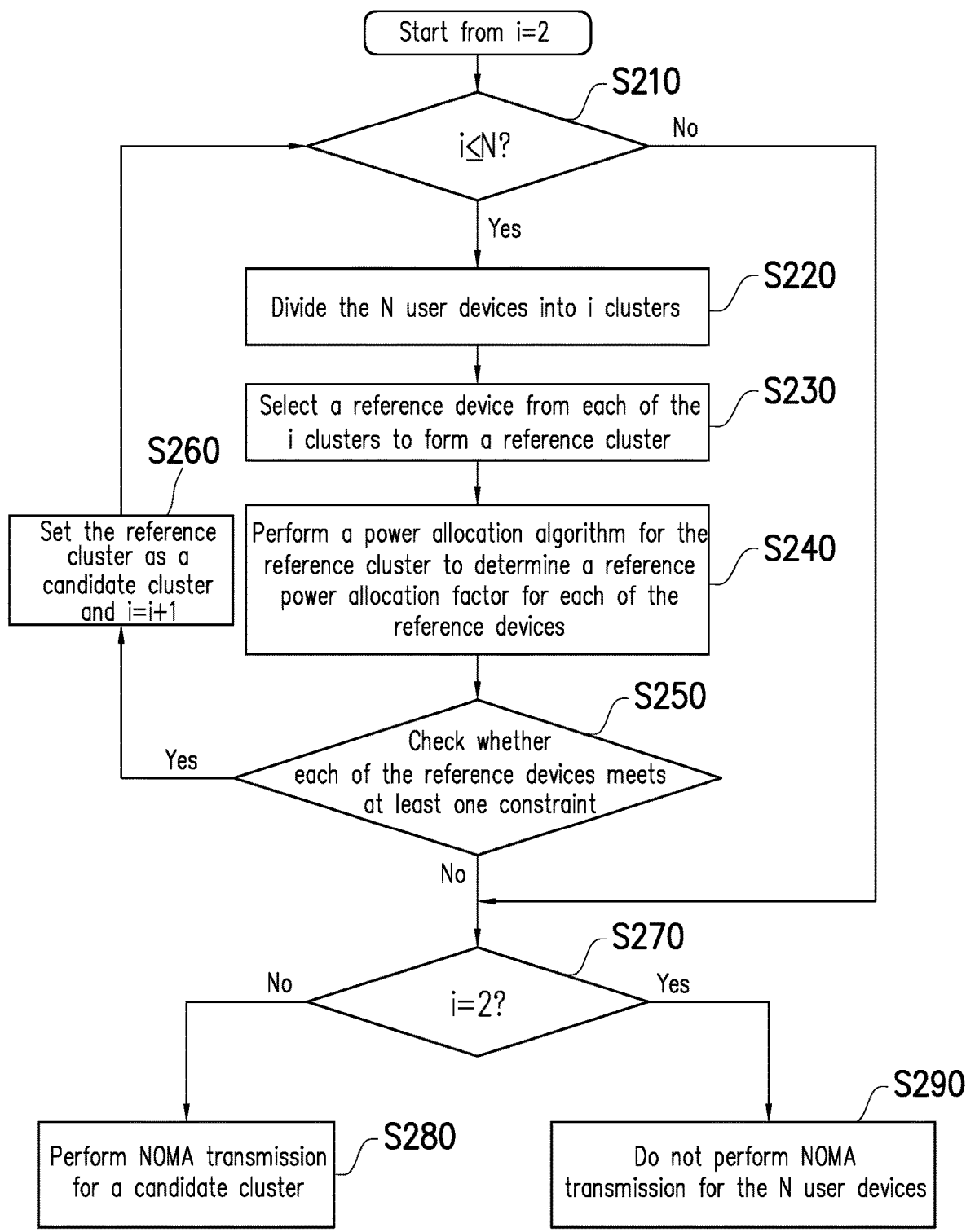
FIG. 2 illustrates a user selection method for a NOMA system according to an embodiment of the disclosure.

Referring to FIG. 2, it illustrates a user selection method according to an embodiment of the disclosure. The method of the present embodiment may be applicable to the NOMA system 100 depicted in FIG. 1, details related to each step illustrated in FIG. 2 will be described with reference to the contents related to the embodiment illustrated in FIG. 1, and according to the assumption in the previous embodiment, the channel gains of the user devices 20_1-20_N are sorted in descending order (i.e., $|h_1|^2 > |h_2|^2 > \ldots > |h_N|^2$).

In overview, in the user selection method of the disclosure, after the user devices 20_1-20_N are divided into i clusters (where i is a positive integer greater than or equal to 2 and less than or equal to N), a user device may be selected from each of the i clusters to serves as a reference device to form a reference cluster. Then, the power allocation algorithm which has been described by the previous embodiment may be performed for the i reference devices in the reference cluster, and subsequently whether each of the i reference devices meets some predetermined constraints may be checked. If yes, the aforementioned method may be again performed after the reference cluster is set as a candidate cluster, and the value of i is increased by 1. When the i reference devices selected at a certain value of i are not all capable of meeting the predetermined constraints, NOMA transmission is performed for the candidate cluster (i.e., the reference cluster formed previously at the value of i-1), thereby improving the detection performance for the served user devices.

Figure 3A:
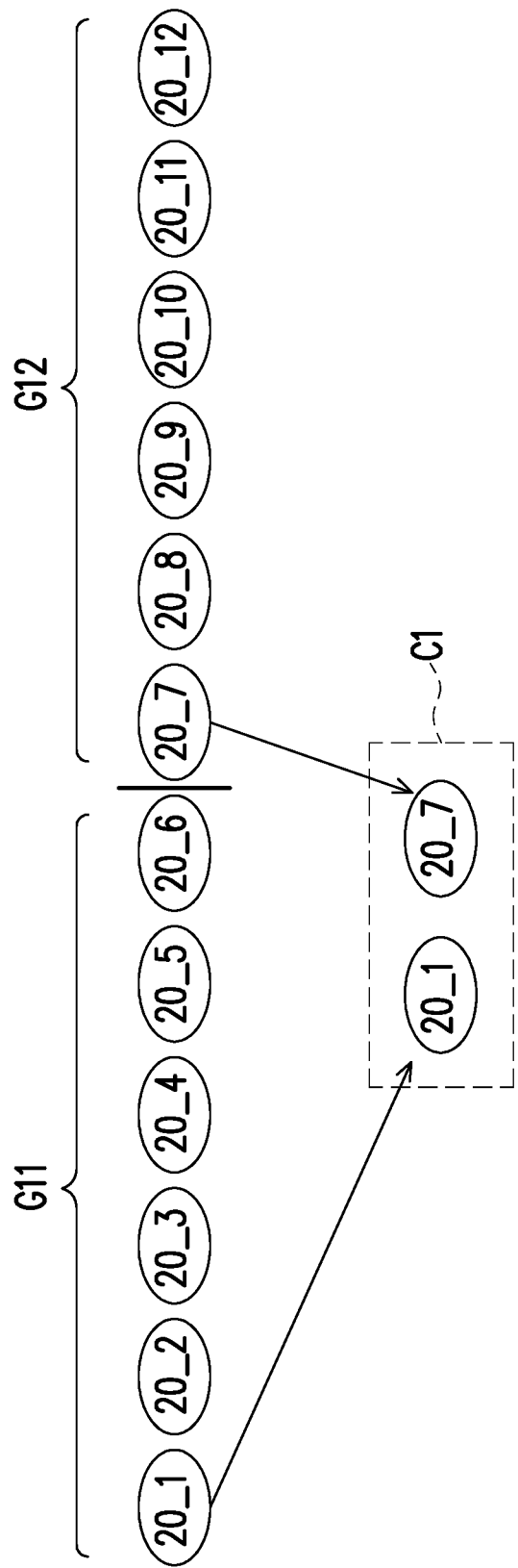
FIG. 3A to FIG. 3C illustrate application scenarios of the user selection method according to embodiments of the disclosure.
Figure 3B:
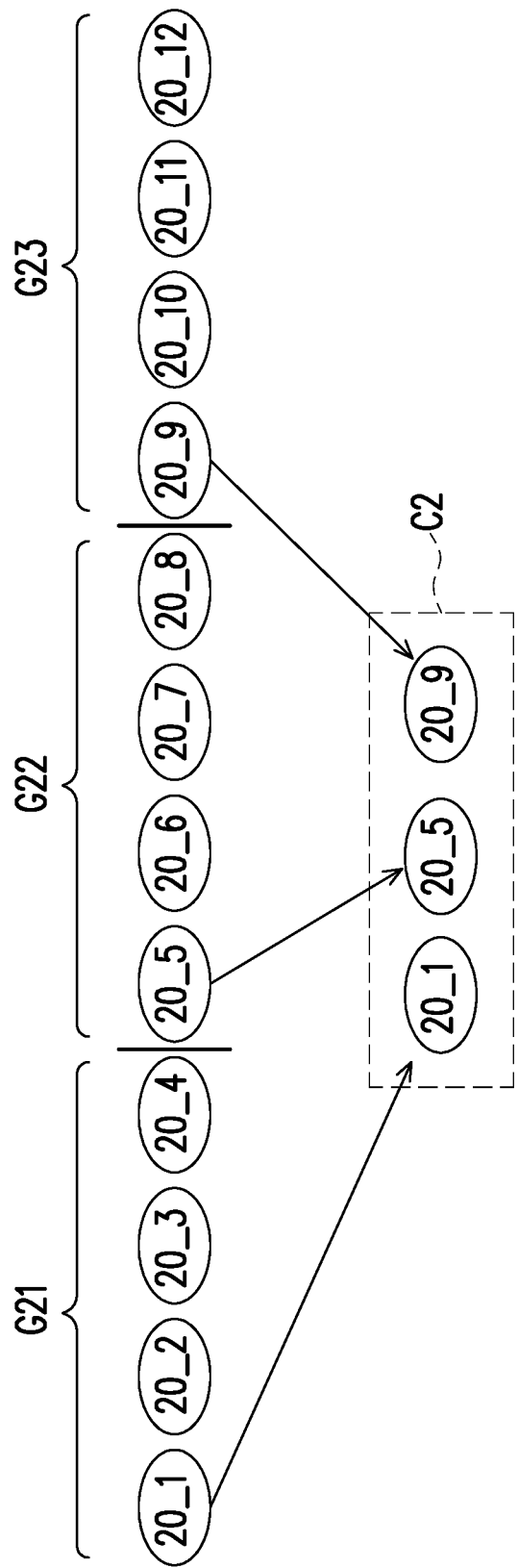
Figure 3C:
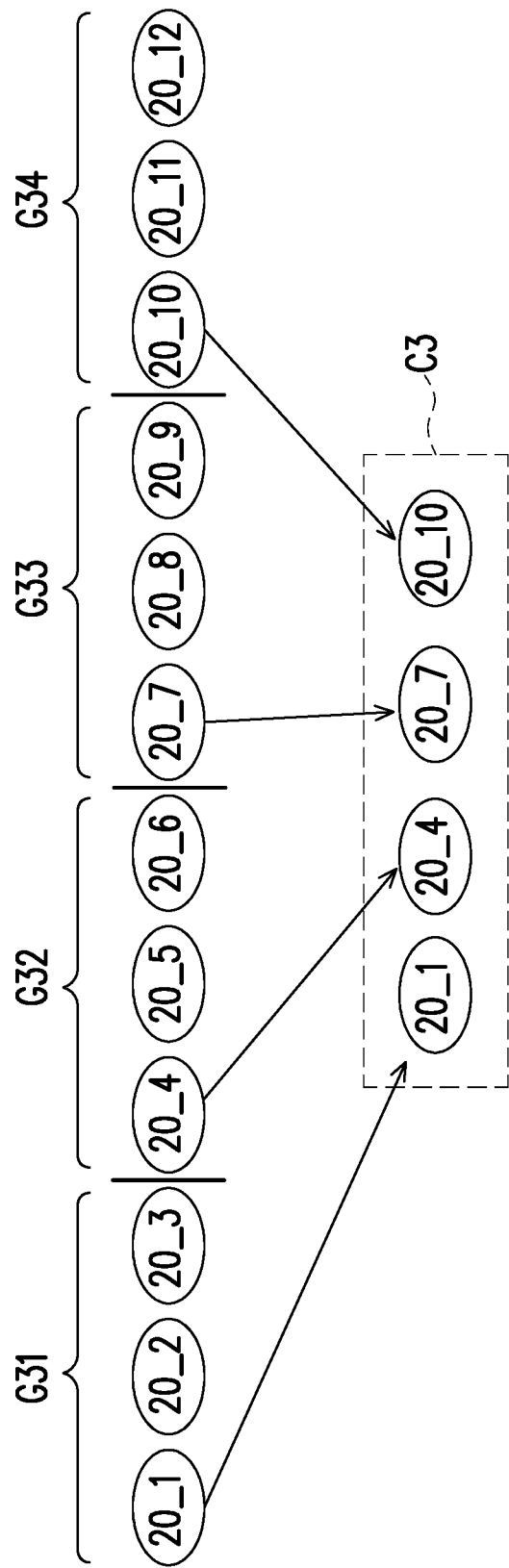

Thus, when the method illustrated in FIG. 2 is performed, the value of i may be initiated to be 2 (i.e., the user devices 20_1-20_N are divided into 2 clusters). In addition, to make the method provided by the disclosure to be more comprehensive, the related description will be set forth with reference to scenarios depicted in FIG. 3A to FIG. 3C. In FIG. 3A to FIG. 3C, N is, for example, 12, but it is not intended to limit the possible implementation manners of the disclosure.

In the condition that the value of i is initiated to be 2, in step S210, the processing circuit 13 may check whether i≤N to subsequently perform step S220.

In step S220, the processing circuit 13 may divide the user devices 20_1-20_12 into 2 clusters. In an embodiment, the processing circuit 13 may evenly divide the user devices 20_1-20_N into 2 clusters (for example, a cluster G11 including the user devices 20_1-20_6 and a cluster G12 including the user devices 20_7-20_12), as illustrated in FIG. 3A, but the possible implementation manners of the disclosure are not limited thereto.

Then, in step S230, the processing circuit 13 may select multiple reference devices from the i clusters, and the reference devices may correspond one-to-one to the i clusters. In an embodiment, the processing circuit 13 may select the reference device with the highest channel gain from each of the i clusters. Taking FIG. 3A for example, the processing circuit 13 may select the user device 20_1 with the highest channel gain from the cluster G11 as the reference device and select user device 20_7 with the highest channel gain from the cluster G12 as the reference device. In addition, in the present embodiment, the user devices 20_1 and 20_7 may form a reference cluster C1. In this case, a channel gain difference between each reference devices in the reference cluster C1 may be set to be sufficiently large, such that the reference devices with lower channel gain do not consume excessive resources (e.g., transmission power), and the reference devices with higher channel gain may be allocated with higher transmission power to boost the transmission rate.

Thereafter, in step S240, the processing circuit 13 may perform the power allocation algorithm for the reference cluster C1 to determine the reference power allocation factor corresponding to each reference device. According to the power allocation algorithm, for example, the power allocation factors corresponding to the reference devices (i.e., the user devices 20_1 and 20_7) in the reference cluster C1 are calculated based on formulas (8a) to (8c). It is to be noted that the base station 10 calculates formulas (8a) to (8c) for the N user devices 20_1-20_N illustrated in FIG. 1 to obtain the power allocation factors $\alpha_1$-$\alpha_N$ corresponding to the user devices 20_1-20_N. However, in order to make formulas (8a) to (8c) adaptive to the reference cluster C1 illustrated in FIG. 3A, the related operational mechanisms may be adjusted as follows.

Specifically, the processing circuit 13 may sort the channel gain of each reference device in the reference cluster C1 in descending order. In this case, after being sorted, the user device 20_1 is the 1st reference device in the reference cluster C1, and the user device 20_7 is the 2nd (i.e., the ith) reference device in the reference cluster C1. Correspondingly, formulas (8a) to (8c) may be re-written as:

$$\alpha_i = \frac{1 + \mu_i^{-1}}{1 + \phi_i^{-1}} \quad (8a')$$

$$\alpha_n = \left(\frac{\alpha_{n+1}}{\phi_{n+1}} - \frac{1}{\mu_{n+1}} + \frac{1}{\mu_n}\right)\left(\frac{\phi_n}{1 + \phi_n}\right), 2 \le n \le (i-1) \quad (8b')$$

$$\alpha_1 = 1 - \sum_{n=2}^{i} \alpha_n. \quad (8c')$$

Thus, the reference power allocation factors $\alpha_1$ and $\alpha_2$ corresponding to the 1st reference device (i.e., the user device 20_1) and the 2nd reference device (i.e., the user device 20_7) in the reference cluster C1 may be calculated based on formulas (8a') to (8c'), wherein $\mu_n=(P_T|h_n|^2)/V_0$, $|h_n|^2$ represents the channel gain for the nth reference device in the reference cluster C1, $1 \le n \le i$, $P_T$ represents a total transmission power of the NOMA system 100, and $V_0$ represents a noise power.

Thereafter, in step S250, the processing circuit 13 may check whether each reference device in the reference cluster C1 meets the constraints. In an embodiment, for the nth reference device in the reference cluster C1, the constraints may include SIC and transmit signal-to-noise ratio (transmit SNR) constraints.

In detail, in order to implement the SIC function based on the NOMA principle, the channel gain difference between the reference devices in the cluster (for example, the reference cluster C1) served by the base station 10 is quite important to system performance, and the system performance also relates to the transmission power corresponding to each reference device. Thus, for the nth reference device in the reference cluster C1, its received power should be greater than a sum of intra-cluster interference and noise for detecting the signals from other reference devices without errors. Therefore, the SIC constraint for the nth reference device in the reference cluster C1 may be expressed as:

$$P_n \eta_{n-1} - \Sigma_{k=1}^{n-1} P_k \eta_{n-1} \ge P_{D,min}, 2 \le n \le i, \quad (11)$$

wherein $\eta_n = |h_n|^2/V_0$ and $P_{D,min}$ represents a minimum power difference required to differentiate a desired signal (a signal to be transmitted to the nth reference device) from other interference signals. Correspondingly, SIC constraint (11) may be re-written as:

$$\alpha_n \mu_{n-1} - \Sigma_{k=1}^{n-1} \alpha_k \mu_{n-1} \ge P_{D,min}. \quad (12)$$

In this case, for the nth reference device in the reference cluster C1, the processing circuit 13 may check whether the corresponding SIC constraint is satisfied based on the related reference power allocation factors. If yes, it represents that the intra-cluster interference may be successfully removed from the nth reference device in the reference cluster C1 by performing SIC for the received signal.

However, SIC constraint (12) may guarantee SIC performance for the nth reference device in the reference cluster C1, but may not guarantee whether it is capable of detecting its own signal. To ensure the detection performance (for example, a bit error rate (BER)) for the nth reference device in the reference cluster C1, a corresponding transmit SNR requirement for the nth reference device in the reference cluster C1 may be further considered.

For each reference device, the transmit SNR requirement may be derived from the corresponding target BER and channel gain. For an AWGN channel, a received SNR requirement for the nth reference device in the reference cluster C1 may be denoted by $\gamma_{R,n}$, and the corresponding transmit SNR requirement is equal to the received SNR requirement divided by the channel gain (i.e., $\gamma_{R,n}/|h_n|^2$).

For the nth reference device in the reference cluster C1, its received SNR may be expressed as:

$$\gamma_n = \frac{P_n |h_n|^2}{\sum_{k=1}^{n-1} P_k |h_n|^2 + V_0} \quad (13)$$

and the corresponding transmit SNR can be expressed as:

$$\gamma'_n = \frac{P_n}{\sum_{k=1}^{n-1} P_k |h_n|^2 + V_0}. \quad (14)$$

Hence, to guarantee the receiving performance of the nth reference device in the reference cluster C1, the transmit SNR must be greater than the corresponding transmit SNR requirement. Namely, the transmit SNR constraint for the nth reference device in the reference cluster C1 may be expressed as $\gamma'_n > \gamma_{R,n}/|h_n|^2$.

Based on the description set forth above, if the processing circuit 13 determines in step S250 that each reference device in the reference cluster C1 meets the aforementioned constraints (for example, the SIC and transmit SNR constraints), the processing circuit 13 may continue to perform step S260 to set the reference cluster C1 as a candidate cluster (hereinafter referred to as $C_{NOMA}$) and set each reference device in the reference cluster C1 as a candidate device. Next, the processing circuit 13 may increase the value of i by i=i+1 (the increased value of i is, for example, 3) and then return to step S210.

In a condition that the increased value of i is still less than N, the processing circuit 13 performs steps S220-S250 based on the new value of i. The corresponding description will be made below with reference to FIG. 3B.

In FIG. 3B, the processing circuit 13 may perform step S220 to divide the user devices 20_1-20_12 into 3 clusters. In an embodiment, the processing circuit 13 may evenly divide the user devices 20_1-20_N into 3 clusters (for example, a cluster G21 including the user devices 20_1-20_4, a cluster G22 including the user devices 20_5-20_8 and a cluster G23 including the user devices 20_9-20_12), but the possible implementation manners of the disclosure are not limited thereto.

Then, in step S230, the processing circuit 13 may select a plurality of reference devices from the i clusters, and the reference devices may correspond one-to-one to the i clusters. In an embodiment, the processing circuit 13 may select the reference device with the highest channel gain from each of the i clusters. Taking FIG. 3B for example, the processing circuit 13 may select the user device 20_1 with the highest channel gain from the cluster G21 as the reference device, select the user device 20_5 with the highest channel gain from the cluster G22 as the reference device and select the user device 20_9 with the highest channel gain from the cluster G23 as the reference device. In addition, in the present embodiment, the user devices 20_1, 20_5 and 20_9 may form a reference cluster C2.

Thereafter, in step S240, the processing circuit 13 performs the power allocation algorithm for the reference cluster C2 to determine the reference power allocation factor corresponding to each reference device. In the present embodiment, the processing circuit 13 may sort the channel gain of each reference device in the reference cluster C2 in descending order. After being sorted, the user device 20_1 is the 1st reference device in the reference cluster C2, the user device 20_5 is the 2nd reference device in the reference cluster C2, and the user device 20_9 is the 3rd (i.e., the ith) reference device in the reference cluster C2.

Afterwards, the reference power allocation factors $\alpha_1$-$\alpha_3$ corresponding to the 1st reference device (i.e., the user device 20_1), the 2nd reference device (i.e., the user device 20_5), and the 3rd reference device (i.e., the user device 20_9) in the reference cluster C2 may be derived according to what has been described by the previous embodiment, and thus will not be repeated.

In step S250, the processing circuit 13 may check whether each reference device in the reference cluster C2 meets the constraints. In an embodiment, for the nth reference device in the reference cluster C2, the constraints may include SIC and transmit SNR constraints. Both may be derived according to the description of the previous embodiment, and thus will not be repeated.

If the processing circuit 13 determines in step S250 that each reference device in the reference cluster C2 satisfies the aforementioned constraints (for example, the SIC and transmit SNR constraints), the processing circuit 13 may continue to perform step S260 to set the reference cluster C2 as a candidate cluster $C_{NOMA}$ (i.e., the candidate cluster $C_{NOMA}$ is obtained by substituting the reference cluster C2 for the reference cluster C1) and set each reference device in the reference cluster C2 as a candidate device. Next, the processing circuit 13 may increase the value of i by i=i+1 (the increased value of i is, for example, 4) and then, return to step S210.

In a condition that the increased value of i is still less than N, the processing circuit 13 again performs steps S220-S250 based on the new value of i. The corresponding description will be made below with reference to FIG. 3C.

In FIG. 3C, the processing circuit 13 may perform step S220 to divide the user devices 20_1-20_12 into 4 clusters. In an embodiment, the processing circuit 13 may evenly divide the user devices 20_1-20_N into 4 clusters (for example, a cluster G31 including the user devices 20_1-20_3, a cluster G32 including the user devices 20_4-20_6, a cluster G33 including the user devices 20_7-20_9 and a cluster G34 including the user devices 20_10-20_12), but the possible implementation manners of the disclosure are not limited thereto.

Then, in step S230, the processing circuit 13 may select a plurality of reference devices from the i clusters, and the reference devices may correspond one-to-one to the i clusters. In an embodiment, the processing circuit 13 may select the reference device with the highest channel gain from each of the i clusters. Taking FIG. 3C for example, the processing circuit 13 may select the user device 20_1 with the highest channel gain from the cluster G31 as the reference device, select the user device 20_4 with the highest channel gain from the cluster G32 as the reference device, select the user device 20_7 with the highest channel gain from the cluster G33 as the reference device and select the user device 20_10 with the highest channel gain from the cluster G34 as the reference device. In addition, in the present embodiment, the user devices 20_1, 20_4, 20_7 and 20_10 may form a reference cluster C3.

Thereafter, in step S240, the processing circuit 13 may perform the power allocation algorithm for the reference cluster C3 to determine the reference power allocation factor for each reference device. In the present embodiment, the processing circuit 13 may sort the channel gain of each reference device in the reference cluster C3 in descending order. After being sorted, the user device 20_1 is the 1st reference device in the reference cluster C3, the user device 20_4 is the 2nd reference device in the reference cluster C3, the user device 20_7 is the 3rd reference device in the reference cluster C3, and the user device 20_10 is the 4th (i.e., the ith) reference device in the reference cluster C3.

Afterwards, the reference power allocation factors $\alpha_1$-$\alpha_4$ corresponding to the 1st reference device (i.e., the user device 20_1), the 2nd reference device (i.e., the user device 20_4), the 3rd reference device (i.e., the user device 20_7), and the 4th reference device (i.e., the user device 20_10) in the reference cluster C3 may be derived according to the description of the previous embodiment, and thus will not be repeated.

In step S250, the processing circuit 13 may check whether each reference device in the reference cluster C3 meets the constraints. In an embodiment, for the nth reference device in the reference cluster C3, the constraints may include the SIC and transmit SNR constraints. Both may be derived according to the description of the previous embodiment, and thus will not be repeated.

In an embodiment, if the processing circuit 13 determines in step S250 that not every reference device in the reference cluster C3 meets the constraints (for example, the SIC and transmit SNR constraints), the processing circuit 13 may continue to perform step S270 to check whether i is equal to 2. If yes, NOMA transmission is not performed for the N user devices, as shown in step S290. In the scenario illustrated in FIG. 3C (i.e., i=4), as i is not equal to 2, the processing circuit 13 may perform step S280 of NOMA transmission for the candidate cluster $C_{NOMA}$ (i.e., the reference cluster C2 illustrated in FIG. 3B).

In an embodiment, the processing circuit 13 may determine a transmission power for each candidate device based on the power allocation factor corresponding to each candidate device. Based on the description related to FIG. 3B, the processing circuit 13 may calculate the transmission power for each reference device in the reference cluster C2 based on the reference power allocation factors $\alpha_1$-$\alpha_3$ corresponding to the 1st reference device (i.e., the user device 20_1), the 2nd reference device (i.e., the user device 20_5) and the 3rd reference device (i.e., the user device 20_9) in the reference cluster C2. Specifically, for the nth reference device in the reference cluster C2, the transmission power is denoted by $P_n = \alpha_n P_T$.

Therefore, the processing circuit 13 may allocate the transmission power for each candidate device to the signal corresponding to each candidate device to generate a transmission signal corresponding to each candidate device and superimpose the transmission signals corresponding to all the candidate devices to generate a cluster transmission signal (which may be expressed as $x = \sum_{n=1}^{i} \sqrt{P_n} S_n$). In addition, the processing circuit 13 may control the transceiver circuit 11 to transmit the cluster transmission signal to each candidate device in the candidate cluster.

In this way, the number of the candidate devices served by the base station 10 each time may be maximized while guaranteeing the detection performance and SIC performance for each candidate device.

Additionally, in an embodiment, if determining in step S210 that the value of i is greater than N, the processing circuit 13 may continue to perform step S270. The details may refer to the description set forth above, and thus will not be repeated.

It should be understood that according to the distribution of $h_n$ in the previous embodiments, it is assumed that the channel between base station 10 and each of the user devices 20_1-20_N is a single input single output (SISO) type; however, in other embodiments, the method provided by the disclosure may also be extended to a multiple input multiple output (MIMO) type.

Specifically, in a MIMO scenario, a channel matrix between the base station 10 and each user device 20_n may be denoted by $H_n$, and the square of each singular value of the channel matrix $H_n$ is a subchannel gain. In this case, an effective channel gain of the channel matrix $H_n$ represents a sum of all the squared singular values and may be obtained by calculating the squared Frobenius norm for $H_n$ (i.e., $\|H_n\|_F^2$). Correspondingly, $\mu_n = P_T \|H_n\|_F^2 / V_0$ and $\gamma'_n = P_n / (\sum_{k=1}^{n-1} P_k \|H_n\|_F^2 + V_0)$ Accordingly, the method provided by the disclosure may be applied to a MIMO scenario, in which the power allocated to each user is equally distributed among antennas, such that the number of the candidate devices served by the base station 10 each time may be maximized while guaranteeing the detection performance and SIC performance for each candidate device.

From another perspective, the method provided by the disclosure may also be described as including the following steps: (a) dividing the N user devices into i clusters, wherein i and N are positive integers, and i is greater than or equal to 2 and less than or equal to N; (b) selecting a reference device from each of the i clusters, wherein the reference devices form a reference cluster; (c) performing a power allocation algorithm for the reference cluster to calculate a reference power allocation factor for each of the reference devices, and accordingly checking whether each of the reference devices meets a set of constraints; and (d) if not every reference device in the reference cluster meets the set of constraints, performing NOMA transmission for a candidate cluster, wherein the candidate cluster is formed by a candidate device in each of i−1 clusters when the N user devices is divided into the i−1 clusters, and the candidate device in each of the i−1 clusters meets the set of constraints. Details of each of the steps set forth above may refer to the descriptions related to the previous embodiments and will not be repeated.

In light of the foregoing, in the user selection method of the disclosure, after the user devices are divided into i clusters, a user device can be selected from each of the i clusters to serve as a reference device to form the reference cluster. Then, the power allocation algorithm which has been described in the previous embodiments can be performed for the i reference devices in the reference cluster, and whether all the i reference devices meet some predetermined constraints can be checked. If yes, in the method of the disclosure, the reference cluster can be set as the candidate cluster, the value of i can be increased by 1, and the method can be again performed. When any one of the i user devices selected at a certain value of i fails to meet the predetermined constraints, NOMA transmission can be performed for the candidate cluster (i.e., the reference cluster formed previously at the value of i−1), thereby maximizing the number of the candidate devices served by the base station each time while guaranteeing the detection performance and SIC performance for each candidate device.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A user selection method for a non-orthogonal multiple access (NOMA) system serving N user devices, comprising:
   (a) dividing the N user devices into i clusters, wherein i and N are positive integers, and i ranges between 2 and N;
   (b) selecting a user device from each of the i clusters as a reference device, wherein all the reference devices selected from the i clusters form a reference cluster;
   (c) performing a power allocation algorithm for the reference cluster to determine a reference power allocation factor for each of the reference devices, and accordingly checking whether each of the reference devices meets at least one constraint, wherein the step of performing the power allocation algorithm for the reference cluster to determine the reference power allocation factor for each of the reference devices comprises:
   sorting the reference devices in descending order according to a channel gain of each of the reference devices;
   calculating the reference power allocation factor for each of the sorted reference devices, wherein the reference power allocation factor corresponding to an nth reference device among the sorted reference devices is denoted by a, and n ranges between 1 and i, wherein $$\alpha_i = \frac{1 + \mu_i^{-1}}{1 + \phi_i^{-1}}, \phi_n = 2^{R_n} - 1,$$

$\mu_n = (P_T |h_n|^2) / V_0$, $R_n$ represents a minimum transmission rate requirement of the nth reference device, $P_T$ represents a total transmission power of the NOMA system, $|h_n|^2$ represents the channel gain of the nth reference device, $V_0$ represents a noise power, $$\alpha_n = \left( \frac{\alpha_{n+1}}{\phi_{n+1}} - \frac{1}{\mu_{n+1}} + \frac{1}{\mu_n} \right) \left( \frac{\phi_n}{1 + \phi_n} \right)$$

for $2 \leq n \leq (i-1)$, and $$\alpha_1 = 1 - \sum_{n=2}^{i} \alpha_n;$$

and
   (d) in response to not every reference device in the reference cluster meets the at least one constraint, performing NOMA transmission for a candidate cluster, wherein the candidate cluster is formed by a candidate device in each of i−1 clusters when the N user devices are divided into the i−1 clusters, and the candidate device in each of the i−1 clusters meets the at least one constraint;

(e) in response to each of the reference devices meets the at least one constraint, the method further comprises setting the reference cluster as the candidate cluster and setting i=i+1 and again performing steps (a) to (d).

2. The method of claim 1, wherein the step of dividing the N user devices into the i clusters comprises:

sorting the N user devices according to a channel gain of each of the N user devices; and evenly dividing the sorted N user devices into the i clusters.

3. The method of claim 1, wherein the step of selecting the reference device from each of the i clusters comprises:

selecting the reference device with a highest channel gain from each of the i clusters.

4. The method of claim 1, wherein for the nth reference device, the at least one constraint comprises a continuous interference cancellation (SIC) constraint and a transmit signal-to-noise ratio (SNR) constraint; when 2≤n≤(i), the SIC constraint for the nth reference device is expressed as:

$$\alpha_n \mu_{n-1} - \Sigma_{m=1}^{n-1} \mu_m \mu_{n-1} \geq P_{D,min},$$

wherein $P_{D,min}$ represents a minimum power difference required to differentiate a P wherein desired signal from other interference signals and the desired signal is a signal to be transmitted to the nth reference device; and the transmit SNR constraint for the nth reference device is expressed as:

$$\gamma'_n > \gamma_{R,n}/|h_n|^2,$$

wherein $\gamma'_n$ represents the transmit SNR for the nth reference device, and $\gamma_{R,n}$ represents a received SNR requirement for the nth reference device.

5. The method of claim 1, wherein the power allocation factor for each of the candidate devices is obtained by performing the power allocation algorithm for the candidate cluster, and the step of performing NOMA transmission for the candidate cluster comprises:

determining a transmission power for each of the candidate devices based on the power allocation factor corresponding to each of the candidate devices;

allocating the transmission power for each of the candidate devices to a signal corresponding to each of the candidate devices to generate a transmission signal corresponding to each of the candidate devices;

superposing the transmission signals corresponding to all the candidate devices in the candidate cluster to generate a cluster transmission signal; and transmitting the cluster transmission signal to the candidate cluster.

6. The method of claim 1, wherein if not every reference device in the reference cluster meets the at least one constraint, the method further comprises:

checking whether i is equal to 2;

if no, performing NOMA transmission for the candidate cluster; and if yes, not performing NOMA transmission for the N user devices.

7. A base station, adapted for serving N user devices in a NOMA system, comprising:

a transceiver circuit, configured to transmit messages to at least two user devices;

a storage circuit, storing a plurality of modules; and a processing circuit, coupled to the storage circuit and the transceiver circuit, and configured to access the modules to perform steps comprising:

(a) dividing the N user devices into i clusters, wherein i and N are positive integers, and i ranges between 2 and N;

(b) selecting a user device from each of the i clusters as a reference device, wherein all the reference devices selected from the i clusters form a reference cluster;

(c) performing a power allocation algorithm for the reference cluster to determine a reference power allocation factor for each of the reference devices, and accordingly checking whether each of the reference devices meets at least one constraint, wherein the processing circuit is configured to:

sorting the reference devices in descending order according to a channel gain of each of the reference devices;

calculating the reference power allocation factor for each of the sorted reference devices, wherein the reference power allocation factor corresponding to an nth reference device among the sorted reference devices is denoted by $\alpha_n$ and n ranges between 1 and i, wherein $$\alpha_i = \frac{1 + \mu_i^{-1}}{1 + \phi_i^{-1}}, \phi_n = 2^{R_n} - 1,$$

$\mu_n = (P_T|h_n|^2)/V_0$, $R_n$ represents a minimum transmission rate requirement of the nth reference device, $P_T$ represents a total transmission bower of the NOMA system, $|h_n|^2$ represents the channel gain of the nth reference device, $V_0$ represents a noise power, $$\alpha_n = \left(\frac{\alpha_{n+1}}{\phi_{n+1}} - \frac{1}{\mu_{n+1}} + \frac{1}{\mu_n}\right)\left(\frac{\phi_n}{1 + \phi_n}\right)$$

for 2≤n≤(i−1), and $$\alpha_1 = 1 - \sum_{n=2}^{i} \alpha_n;$$

and (d) in response to not every reference device in the reference cluster meets the at least one constraint, performing NOMA transmission for a candidate cluster, wherein the candidate cluster is formed by a candidate device in each of i−1 clusters when the N user devices are divided into the i−1 clusters, and the candidate device in each of the i−1 clusters meets the at least one constraint;

(e) in response to each of the reference devices meets the at least one constraint, the method further comprises setting the reference cluster as the candidate cluster, setting i=i+1 and again performing steps (a) to (d).

8. The base station of claim 7, wherein the processing circuit is configured to:

sort the N user devices according to a channel gain of each of the N user devices; and evenly divide the sorted N user devices into the i clusters.

9. The base station of claim 7, wherein the processing circuit is configured to:
   select the reference device with a highest channel gain from each of the i clusters.

10. The base station of claim 7, wherein for the nth reference device, the at least one constraint comprises an SIC constraint and an SNR constraint; when $2 \leq n \leq i$, the SIC constraint for the nth reference device is expressed as:

$$\alpha_n \mu_{n-1} - \Sigma_{m=1}^{n-1} \alpha_m \mu_{n-1} \geq P_{D,min},$$

wherein $P_{D,min}$ represents a minimum power difference required to differentiate a desired signal from other interference signals and the desired signal is a signal to be transmitted to the nth reference device; and the transmit SNR constraint for the nth reference device is expressed as:

$$\gamma'_n > \gamma_{R,n}/|h_n|^2,$$

wherein $\gamma'_n$ represents the transmit SNR for the nth reference device, and $\gamma_{R,n}$ represents a received SNR requirement for the nth reference device.

11. The base station of claim 7, wherein the power allocation factor for each of the candidate devices is obtained by performing the power allocation algorithm for the candidate cluster, and the processing circuit is configured to:
   determine a transmission power for each of the candidate devices based on the power allocation factor corresponding to each of the candidate devices;
   multiply a signal corresponding to each of the candidate devices by the square root of the transmission power for each of the candidate devices to generate a transmission signal corresponding to each of the candidate devices;
   superpose the transmission signals corresponding to all the candidate devices in the candidate cluster to generate a cluster transmission signal; and
   transmit the cluster transmission signal to the candidate cluster.

12. The base station of claim 7, wherein if any one of the reference devices in the reference cluster does not meet the at least one constraint, the processing circuit is further configured to:
   check whether i is equal to 2;
   if no, perform NOMA transmission for the candidate cluster; and
   if yes, do not perform NOMA transmission for the N user devices.

13. A user selection method in a NOMA system serving N user devices, comprising:
   (a) dividing the N user devices into i clusters, wherein i and N are positive integers, and i ranges between 2 and N;
   (b) selecting a user device from each of the i clusters as a reference device, wherein all the reference devices selected from the i clusters form a reference cluster;
   (c) performing a power allocation algorithm for the reference cluster to calculate a reference power allocation factor for each of the reference devices, and accordingly checking whether each of the reference devices meets a set of constraints, wherein the step of performing the power allocation algorithm for the reference cluster to determine the reference power allocation factor for each of the reference devices comprises:
   sorting the reference devices in descending order according to a channel gain of each of the reference devices;
   calculating the reference power allocation factor for each of the sorted reference devices, wherein the reference power allocation factor corresponding to an nth reference device among the sorted reference devices is denoted by $\alpha_n$ and n ranges between 1 and i, wherein $$\alpha_i = \frac{1 + \mu_i^{-1}}{1 + \phi_i^{-1}},$$

$$\phi_n = 2^{R_n} - 1,$$

$\mu_n = (P_T|h_n|^2)/V_0$, $R_n$ represents a minimum transmission rate requirement of the nth reference device, $P_T$ represents a total transmission power of the NOMA system, $|h_n|^2$ represents the channel gain of the nth reference device, $V_0$ represents a noise power, $$\alpha_n = \left(\frac{\alpha_{n+1}}{\phi_{n+1}} - \frac{1}{\mu_{n+1}} + \frac{1}{\mu_n}\right)\left(\frac{\phi_n}{1 + \phi_n}\right)$$

for $2 \leq n \leq (i-1)$, and $$\alpha_1 = 1 - \sum_{n=2}^{i} \alpha_n;$$

and
   (d) in response to any one of the reference devices in the reference cluster fails to meet the set of constraints, performing NOMA transmission for a candidate cluster, wherein the candidate cluster is formed by a candidate device in each of i−1 clusters when the N user devices is divided into the i−1 clusters, and the candidate device in each of the i−1 clusters meets the set of constraints;
   (e) in response to each of the reference devices meets the at least one constraint, the method further comprises setting the reference cluster as the candidate cluster and setting i=i+1 and again performing steps (a) to (d).

* * * * *